(No Model.) 2 Sheets—Sheet 1.

O. B. BEACH
CYCLOMETER.

No. 366,447. Patented July 12, 1887.

Witnesses
J. H. Shumway
Fred C. Earle

Oliver B. Beach, Inventor,
Wm C. Earle, atty (No Model.) 2 Sheets—Sheet 2.

O. B. BEACH.
CYCLOMETER.

No. 366,447. Patented July 12, 1887.

UNITED STATES PATENT OFFICE.

OLIVER B. BEACH, OF STONY CREEK, CONNECTICUT.

CYCLOMETER.

SPECIFICATION forming part of Letters Patent No. 366,447, dated July 12, 1887.

Application filed March 30, 1887. Serial No. 232,969. (No model.)

*To all whom it may concern:*

Be it known that I, OLIVER B. BEACH, of Stony Creek, in the county of New Haven and State of Connecticut, have invented a new Improvement in Cyclometers; and I do hereby declare the following, when taken in connection with accompanying drawings and the letters of reference marked thereon, to be a full, clear, and exact description of the same, and which said drawings constitute part of this specification, and represent, in—

Figure 1:
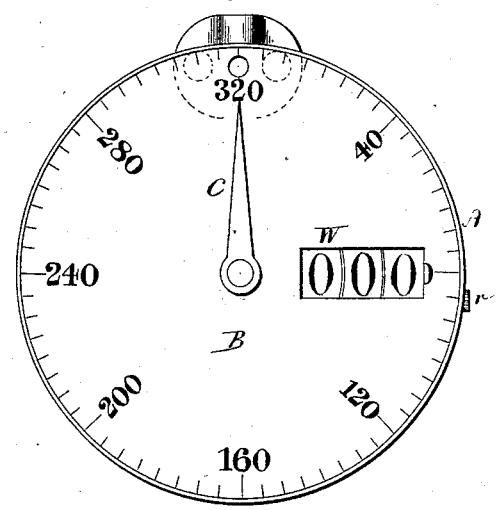
Figure 2:
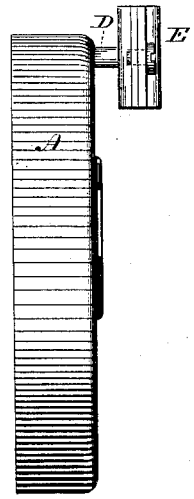
Figure 3:
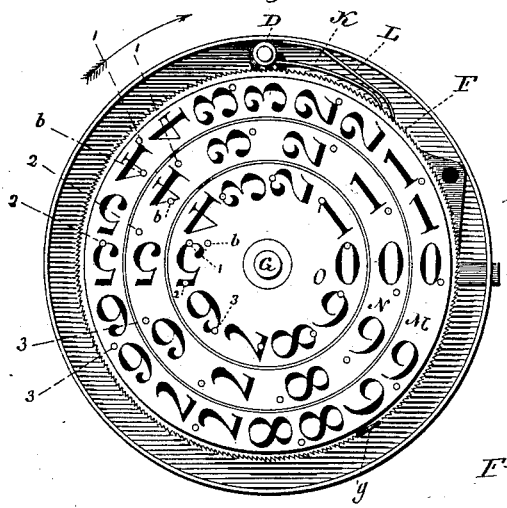
Figure 4:
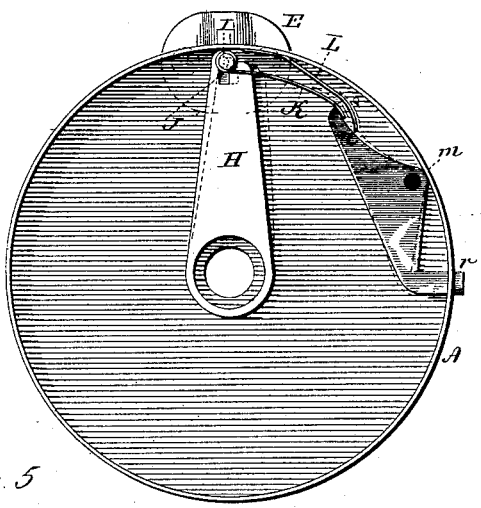
Figure 5:
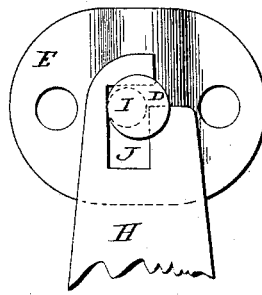
Figure 6:
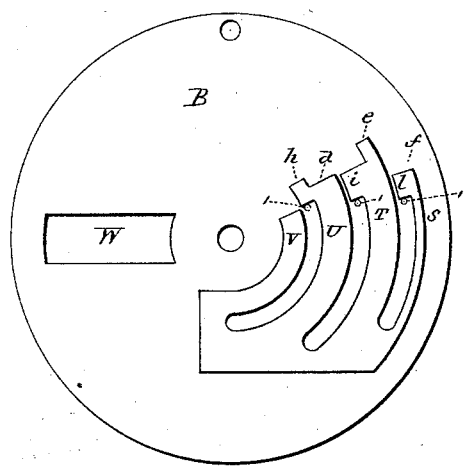
Figure 7:
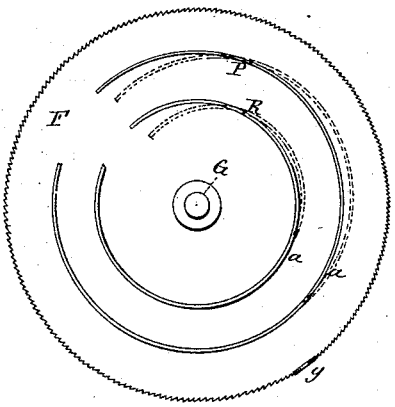
Figure 8:
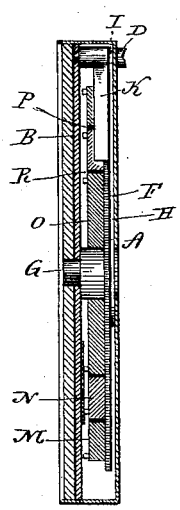
Figure 9:
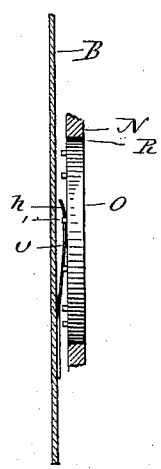

Figure 1, a face view of the cyclometer complete; Fig. 2, a side view of the same; Fig. 3, an inside view looking upon the count-rings, the dial removed; Fig. 4, an inside view of the case, the count-rings and disk F removed, showing the device for actuating the pawl K; Fig. 5, a detached view, enlarged, showing the eccentric connection between the shaft D and the lever H; Fig. 6, an inside view of the dial, showing the several stop-dogs; Fig. 7, the disk F with the count-rings removed, showing the friction partition-springs; Fig. 8, a sectional side view; Fig. 9, a sectional view showing one of the dogs and the studs in the rings with which it engages.

This invention relates to an improvement in devices for determining the distance run by velocipedes or other vehicles, commonly called "cyclometers," parts of the invention, however, being applicable to other registering devices; and the invention relates more particularly to that class of cyclometers or registering devices in which the units, tens, hundreds, &c., are successively presented by concentric rings to an opening, so as to indicate revolutions of the respective figures, units, tens, hundreds, &c., the object being a simple and compact device which is adapted to be hung upon one of the spokes of a bicycle or velocipede wheel, so that the revolutions of the wheel may be indicated by the figures presented to an opening in a dial.

The case A is of cylindrical form, made from metal, and provided with a dial, B, upon which graduations are made—say indicating rods—and so that the full circumference of the dial indicates, say, three hundred and twenty rods, or one mile, as a full revolution of the pointer C on the dial.

At one point near the periphery of the dial, and in suitable bearings, a shaft, D, is arranged parallel with the axis of the case, but free to revolve in its bearings. This shaft is provided with a clamp, E, by which it may be secured to one of the spokes of the vehicle-wheel, and so that, the shaft being clamped to the wheel, it will hold the case A suspended, and so that as the wheel revolves the case will necessarily revolve with it; but, being suspended free upon the shaft, it follows that gravity will prevent the case from revolving with the shaft D, but, on the contrary, will maintain its same vertical position irrespective of the position of the shaft D with relation to the vehicle-wheel; consequently, as the vehicle-wheel revolves once and the case does not revolve, it follows that the shaft will make one revolution in each revolution of the vehicle-wheel independent of the case.

Upon the inside of the case is a disk, F, having series of teeth upon its periphery to form a ratchet-wheel, hung upon a concentric axis, G, in the case, the axis of the ratchet being substantially parallel with the axis of the vehicle-wheel. On the same axis an arm, H, is hung, (see Fig. 4,) adapted to swing in a plane parallel with the disk F. On the shaft D, inside the case, is an eccentric, I, (see Fig. 5,) which works in a slot, J, in the outer end of the arm H, and so that each revolution of the shaft D will impart a full vibratory movement to the arm H, as indicated in broken lines, Fig. 4. The arm H carries a pawl, K, which is adapted to work in the teeth of the disk F, as seen in Fig. 3, and so that at each full vibration of the arm H the pawl K will impart to the disk F one step in its rotation. A spring stop-dog, L, is provided, which will engage the teeth of the periphery of the disk as the disk is advanced by the pawl K, and so as to prevent the retreat of the disk as the pawl is drawn back for a new engagement.

On the face of the disk F the concentric counting-rings M, N, and O are arranged, presenting figures indicating, respectively, units, tens, and hundreds. The number of rings, however, may be more or less, according to the count or registration required.

The disk F is provided with concentric partitions P and R, (see Fig. 7,) between the respective count-rings M, N, and O. These partitions are designed to produce frictional engagement with the respective rings, so that if the said rings be free the movement of the disk will be imparted to said rings; and to insure this engagement the partitions P R are made in the form of thin flat springs secured to the plate, but free therefrom for a portion of their circumference—say as from $a$, Fig. 7, to one end of the spring—and from the point $a$ to the other end of the spring they are secured to the disk, the curve of the spring or free portion of the partitions being normally of a different curve from that of the adjacent faces of corresponding rings, as indicated by broken lines in Fig. 7, and so that this different curvature of the free portion of the partitions causes them to act like springs between the respective rings, and so as to produce a pressure upon the adjacent surfaces of the said rings—that is, the inner spring, R, upon the inner ring and the spring P upon the second ring. At the same time the curvature of the springs permits them to press outward against the next ring, so that the spring R also bears against the inside of the second ring and the spring P against the inner surface of the outer ring, the friction between the spring-partitions and the several count-rings being sufficient to cause the count-rings to revolve with the disk F when they are free so to do. The count-rings are prevented from rotation, except at predetermined times, by means of spring-dogs S, T, U, and V, fixed upon the inner side of the dial B and so as to bear upon the surface of the several count-rings.

On the face of the count-rings—that is, upon the side next the dial—a series of studs, projections, or teeth are formed at equal distances, there being ten such studs on each count-ring corresponding to the nine units and the naught composing the series of figures of each ring. These studs, as represented in Fig. 3, are on each ring in a line concentric with the ring itself, and for convenience of illustration I will designate the first stud of the series as 1, the second stud 2, the third stud 3, &c. The position of these studs thus referred to corresponds to the position of the dogs on the disk, Fig. 6, when the three naughts of the count-rings are presented before the opening W in the dial. On the outer count-rings there is a single stud or projection, $b$, and a like projection $b$ on each of the other rings, these projections $b$ being inside of or eccentric to the line of the series of studs, and these stand at the initial point, or what I have indicated as the studs 1.

The dog V stands in the path of the stud $b$ of the inner or hundreds ring, and so that when that stud comes to a bearing against the dog V it will prevent the backward rotation of that inner ring beyond the naught point, but will leave the ring free to turn in the advance direction or to be returned until it be brought to that stop or naught position.

The nose $d$ of the dog U acts in the same manner upon the stud $b$ of the second or tens ring, so that while it will leave it free to revolve in an advanced position it will prevent its being turned backward beyond the position of presenting the naught to the opening. The nose $e$ of the dog T acts in the same manner upon the stud $b$ of the third or units ring.

The dog U is constructed with a projection, $h$, at its nose or free end, which stands in the path of the series of studs on the third or hundreds ring, beneath which the said studs must pass as the ring rotates. The face of this projection $h$ toward the count-rings is made of convex shape, as seen in Fig. 9. On the dog T is a like projection, $i$, which stands in the path of the series of studs on the second or tens ring, and on the dog S is a like projection, $l$, which stands in the path of the series of studs on the outer or unit ring.

The rotation of the disk F is in the direction indicated by the arrow in Fig. 3. Starting, say, from the position of zero, as seen in Fig. 3, the projection $g$ of the disk stands against the nose $f$ of the dog S, the stud or projection $b$ on the units-ring stands stopped against the nose $e$ of the dog T, the stud of the tens-ring stands stopped against the nose $d$ of the dog U, and the stud $b$ of the hundreds-ring stands stopped against the dog V. As the disk F completes its full revolution the projection $g$ thereon passes beneath the dog S and raises that dog, so that the projection may escape and pass beyond, and while the disk has been thus revolving, the stud 1 of the units count-ring has been held against the projection $l$ of the dog S, and in like manner the stud 1 of the tens count-ring has been held against the rear end of the projection $i$ of the dog T, and in like manner the stud 1 of the hundreds-ring has been held against the rear end of the projection $h$; but as the stud $g$ passes beneath the dog S and raises it the projection $l$ rises out of the path of the stud 1 on the units-ring and permits that ring then to advance with the disk under the frictional contact of the two; but so soon as the projection $g$ has passed beyond the dog S and the stud 1 on the units-ring has passed beyond the projection $l$ of the dog, then the dog S is free to drop, and comes into the path of the second stud, which, as the disk continues to revolve, will be brought against the rear end of the projection $l$ to hold the units-ring until the next revolution of the disk F, and so continuing, each full revolution of the disk F will release the units-ring and permit its advance one step, it being arrested at each step by the successive or next stud or projection coming against the projection $l$ of the dog S. The units-ring, advancing, takes its stud $b$ from the nose $e$ of the dog T, and as the units-ring advances step by step it finally, in completing its revolution, brings the stud $b$ beneath the dog T and causes its rise, as did the projection $g$ cause the dog S to rise, and so as to raise the projection $i$ of the dog T out of the path of the stud 1 on the tens-ring, which was held by the dog T, and so that the stud 1 passes on and brings the next tens figure into position at the opening in the dial. Then, when the tens-ring completes its full revolution, the stud $b$ thereon passes beneath the dog U and raises that dog to permit the stud 1 of the hundreds-ring to escape, and then will drop into the path of the next stud, 2, and so continuing, each full revolution of the disk F permits one step advance of the units-ring, and a full revolution of the units-ring permits one step advance of the tens, and a full revolution of the tens-ring permits one step advance of the hundreds-ring, and so on if there be more rings, and the figures of the respective rings will be successively presented to the opening, one revolution of the disk F indicating, say, three hundred and twenty rods, or one mile, the 1 of the units-ring will be presented, and each successive figure of the units until a full revolution is made, when the naught will again come to the opening; then the 1 of the tens-ring is presented, and so on in like manner in other registering devices.

In rings arranged concentrically it is desirable that the figures should all be of the same size; but this leaves a blank space between the regular counting figures, and as it takes a considerable portion of the revolution of the disk F to produce a sufficient advance movement of the units-ring to present successive figures, so that the units figure will be removed and a blank space exist for a considerable time, hence there is a space during the beginning of each mile when it is difficult to determine what is the units figure. To overcome this difficulty I double-number the units-ring—that is, make two 1's, two 2's, two 3's, and so on successively, and so that at the completion of the mile one figure will be brought to the desired position in the opening, and then as the ring advances to complete its full step that figure will pass on beyond the opening and another like figure come into place at the opening, thus insuring the position of a figure at the opening at all times.

In case the rings are multiplied to thousands, tens of thousands, &c., the duplication of the figures may be made upon the several outer rings, and in the extreme case it may be desirable to make three or more figures upon the outer ring or rings, so as to insure a proper indication at all times.

It is often desirable to set the indicator at zero, and if this were necessarily done by an advance of the count-ring-carrying disk a very great number of revolutions would be necessary. To avoid this and make the setting convenient I arrange a lever within the case upon a fulcrum, $m$, one arm, $n$, of which rests beneath the nose of the pawl K and the stop-dog L, the other arm, $r$, extends through the side of the case, and so that by pressing the arm $r$ inward the arm $n$ will be thrown outward and raise the dogs, as indicated in broken lines, Fig 4, and so as to leave the disk F free to be turned backward. Upon the reverse side of the case I construct the central shaft, G, so that it may be turned by any suitable instrument applied thereto. This may be in like manner as a clock is set, not necessary to be described. Then as the disk is turned rearward the rings turn with it, the under face of the projections $h$, $i$, and $l$ of the dogs U, T, and S are rounded or inclined at the forward end, as seen in Fig. 9, so that the studs pass freely beneath the dogs, the dogs yielding for them so to do, and so that the rings may be turned until the studs $b$ bring up against the noses $h$, $i$, and $f$ of the several dogs at the zero position.

While I have represented the means for the engagement between the dogs and the rings as studs on the rings—and this I prefer—I wish to be understood as including any substantial equivalent therefor, whereby the engagement and disengagement between the dogs and rings may be produced.

It will be understood that the pointer is fixed to the axis of the disk F and so as to revolve with it, that pointer indicating the fractions of a unit.

This registering device may be employed for indicating revolutions of parts of machinery by applying the pawl-acting shaft to such revolving device, so that the particular revolving part of the machine may impart corresponding revolution to the pawl carrying shaft.

I claim—

1. In a registering device substantially such as described, the combination of a case, a disk, F, hung upon an axis in said case, a shaft, D, parallel with the axis of the disk F, and to which rotation is imparted, a pawl, K, to which reciprocating motion is imparted by said shaft D, the said pawl adapted to work upon the periphery of the said disk F and impart step-by-step rotation thereto, two or more concentric count-rings on said disk, spring-partitions fixed to said disk and between said rings, said springs adapted to bear frictionally upon said rings, each of said count-rings provided with a concentric series of studs, 1 2 3, &c., each of said rings also provided with a stud, $b$, eccentric to the said series of studs, and the disk also provided with a projection, $g$, outside the outer count-ring, with spring-dogs adapted to engage the said series of studs on each ring, and the dog of one ring adapted also to engage the said eccentric stud of the next ring or the projection $g$ on the disk, substantially as described.

2. In a registering device substantially such as described, the combination of a case, a disk hung upon an axis in said case, mechanism, substantially such as described, to impart intermittent rotation to said disk, two or more concentric count-rings on said disk, each of said count-rings provided with a concentric series of studs, 1 2 3, &c., each of said rings also provided with a stud, $b$, eccentric to the said series of studs, with spring-dogs adapted to engage the said series of studs on each ring, and the dog of one ring adapted also to engage the eccentric stud of the next ring, substantially as described.

OLIVER B. BEACH.

Witnesses:
JOHN E. EARLE,
FRED C. EARLE.